(12) United States Patent
Pouzin et al.

(10) Patent No.: US 8,352,553 B2
(45) Date of Patent: Jan. 8, 2013

(54) ELECTRONIC MAIL CONNECTOR

(75) Inventors: Dominic J. Pouzin, Sammamish, WA (US); Ilana Rae Smith, Frederiksberg (DK); Shashi Ranjan, Redmond, WA (US); David Robert Shutt, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 685 days.

(21) Appl. No.: 11/796,788

(22) Filed: Apr. 30, 2007

(65) Prior Publication Data

US 2008/0270550 A1    Oct. 30, 2008

(51) Int. Cl.
G06F 15/16    (2006.01)

(52) U.S. Cl. ........................ 709/206; 709/207

(58) Field of Classification Search .................. 709/206, 709/207
See application file for complete search history.

(56) References Cited

U.S. PATENT DOCUMENTS

| | | | |
|---|---|---|---|
| 6,871,214 B2 | 3/2005 | Parsons et al. | |
| 6,993,489 B1 | 1/2006 | Miglautsch | |
| 7,031,437 B1 | 4/2006 | Parsons et al. | |
| 7,539,291 B2* | 5/2009 | D'Angelo et al. | 379/88.17 |
| 2002/0107931 A1 | 8/2002 | Singh et al. | |
| 2002/0120581 A1 | 8/2002 | Schiavone et al. | |
| 2002/0169842 A1* | 11/2002 | Christensen et al. | 709/206 |
| 2004/0133810 A1 | 7/2004 | Brischke et al. | |
| 2004/0165603 A1* | 8/2004 | D'Angelo et al. | 370/401 |
| 2004/0205770 A1* | 10/2004 | Zhang et al. | 719/313 |
| 2005/0132057 A1 | 6/2005 | Bresnan et al. | |
| 2006/0056385 A1* | 3/2006 | Fotta et al. | 370/351 |
| 2006/0080363 A1 | 4/2006 | Vadlamani et al. | |
| 2006/0080468 A1 | 4/2006 | Vadlamani et al. | |
| 2006/0095476 A1* | 5/2006 | Dauer et al. | 707/200 |
| 2006/0155715 A1* | 7/2006 | Duffek et al. | 707/100 |
| 2006/0161550 A1 | 7/2006 | Carini et al. | |
| 2007/0276836 A1* | 11/2007 | Chatterjee et al. | 707/10 |

FOREIGN PATENT DOCUMENTS

WO    WO0229653 A1    4/2002

OTHER PUBLICATIONS

"Titan eMail eMarketing Management", http://www.northwoodsoft.com/email_broadcast.nws, Jan. 8, 2007. Bellotti, et al. "Taking Email to Task: The Design and Evaluation of a Task Management Centered Email Tool", Date: Apr. 5-10, 2003, http://www2.parc.com/csl/members/nicolas/documents/CHI2003.pdf.

Bellotti, et al., "Innovation in Extremis: Evolving an Application for the Critical Work of Email and Information Management", http://www.parc.xerox.com/research/publications/files/4364.pdf, ACM Conference on Designing Interactive Systems (DIS 2002); Jun. 25-28, 2002; London; England. NY: ACM; 2002; 181-192.

* cited by examiner

*Primary Examiner* — Dustin Nguyen
*Assistant Examiner* — Joel Mesa
(74) *Attorney, Agent, or Firm* — Hope Baldauff Hartman, LLC (57) ABSTRACT

Technologies are described herein for providing a bi-direction e-mail transport between a management ("CRM") server computer and an e-mail server computer. An e-mail connector communicates with a CRM server computer to determine whether any e-mail messages are pending send at the CRM server computer. If any e-mail messages are pending send, the e-mail connector retrieves the e-mail messages from the CRM server computer. The e-mail connector then communicates with an e-mail server computer to send the retrieved e-mail messages to their intended recipients. The e-mail connector may also retrieve e-mail messages from the e-mail server computer and determine whether the e-mail messages are CRM related. If the e-mail messages are CRM related, the e-mail connector is operative to transmit the CRM-related e-mails to the CRM server.

19 Claims, 6 Drawing Sheets

ELECTRONIC MAIL CONNECTOR

BACKGROUND

Customer relationship management ("CRM") systems allow businesses to manage the relationships with their customers, including the capture, storage, and analysis of customer information. Some types of CRM applications are hosted on a remote computer system and offered to subscribers as a service. Subscribers to such a hosted CRM service can utilize the hosted CRM application to manage the relationships with their customers. In many CRM systems, electronic mail ("e-mail") is the preferred method of communicating with customers.

When communicating with customers through a CRM system via e-mail, it is desirable for e-mail messages to be submitted for delivery directly from the CRM subscriber's e-mail system rather than from the CRM system itself. In fact, ensuring that e-mails are sent from the subscriber's e-mail system rather than from the CRM system is often necessary because only the subscriber's e-mail system has rights to submit e-mail messages for delivery from the intended simple mail transfer protocol ("SMTP") domain. Moreover, ensuring that e-mail messages are sent from the subscriber's e-mail system protects the CRM system from issues related to large, dangerous, illegal, and voluminous e-mail messages. This also allows the subscriber to maintain their local e-mail quotas, policies, and archiving rules with respect to CRM-related e-mail messages.

In many CRM installations, such as where the CRM application is hosted at a remote computing system, the subscriber's e-mail system is outside the control of the CRM system because it executes remotely. The subscriber's e-mail system may also be protected by a firewall or other network security device or require credentials for access. In these scenarios, previous CRM systems have relied on e-mail "spoofing," also referred to as "send-impersonation," to create the appearance that CRM-related e-mail messages are being transmitted from the subscriber's e-mail system. E-mail spoofing refers to the process of altering the sender address and possibly other parts of an e-mail header to cause an e-mail to appear as if it originated from a different source. Through the use of spoofing, a message sent from a CRM system can appear as if it was sent from a subscriber's mail system.

The use of spoofing to send CRM-related e-mail messages is problematic, however, because many e-mail systems identify spoofed e-mail messages as unsolicited bulk e-mail ("UBE"). As a result, these types of messages are often quarantined or deleted prior to reaching their intended recipient. Because a CRM subscriber's relationships with its customers are so valuable, the possibility that CRM-related e-mail messages may be identified as UBE and not delivered to a customer is highly undesirable. Moreover, send-impersonation bypasses all of the controls set for the sender's e-mail system, such as policies and quotas. For example, a company may require that a legal disclaimer be appended to all send e-mails. However, send-impersonation will bypass the e-mail system and cause the disclaimer not to be appended.

It is with respect to these considerations and others that the disclosure made herein is provided.

SUMMARY

Technologies are described herein for providing a bi-directional e-mail transport between a CRM server computer and an e-mail server computer. Through aspects presented herein, a CRM server computer can send e-mail messages through a subscriber's e-mail system without the use of spoofing. Because CRM-related e-mail messages are sent by the subscriber's e-mail system rather than being spoofed and sent by a CRM system, the risk that CRM-related e-mail messages will be identified as UBE is greatly reduced.

According to one aspect presented herein, an e-mail connector is disclosed that provides a transport for e-mail messages between a CRM server computer and an e-mail server computer. The e-mail connector communicates with the CRM server computer to determine whether any CRM-related e-mail messages are pending send at the CRM server computer. If any e-mail messages are pending send, the e-mail connector retrieves the e-mail messages from the CRM server computer. The e-mail connector then communicates with an e-mail server computer to send the retrieved e-mail messages to their intended recipients. According to one embodiment, the CRM server exposes an application programming interface ("API") through which the e-mail connector can retrieve e-mail messages that are pending send and perform other functions.

According to other aspects, the e-mail connector is further operative to retrieve e-mail messages from the e-mail server computer and to determine whether the e-mail messages are CRM-related. If the retrieved e-mail messages are CRM-related, the e-mail connector is operative to transmit the CRM-related e-mails to the CRM server. The API includes methods through which the e-mail connector can determine if e-mail messages are CRM-related and transmit CRM-related e-mail messages to the CRM server computer. In this manner, the e-mail connector provides a bi-directional e-mail transport between the CRM server computer and the e-mail server computer for both incoming and outgoing CRM-related e-mail messages.

According to additional aspects, the e-mail connector may be implemented as a plug-in to an e-mail client application program. In this implementation, the plug-in is operative to utilize stored user credentials or a current security context to authenticate itself with the e-mail server computer. Once authenticated, the e-mail client application plug-in can send CRM-related e-mail messages through the e-mail server on behalf of the user whose credentials are used for authentication. Moreover, the plug-in can utilize all of the capabilities provided by the e-mail client application. For instance, because the e-mail client application is already configured to communicate with the e-mail server, the plug-in does not need to be reconfigured for such communication. The plug-in can also promote received e-mail messages to the CRM server computer if the e-mail messages are determined to be CRM-related.

According to other aspects, the e-mail connector may be implemented as a plug-in to a service executing on a server computer. In this implementation, the plug-in may utilize stored service credentials to authenticate itself with the e-mail server computer. Alternately, the plug-in may authenticate itself on the server computer using stored user credentials. This may be useful, for instance, to transmit CRM-related e-mail messages from the server computer on behalf of a user when the e-mail client application plug-in is not executing.

The above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for providing a bi-directional e-mail transport between a CRM server computer and an e-mail server computer. Through the embodiments presented herein, an e-mail connector communicates with a CRM server computer to retrieve e-mail messages that are pending send from the CRM server computer. If any e-mail messages are pending send, the e-mail connector retrieves the e-mail messages and sends the e-mail messages through an e-mail server using stored credentials or a current security context. The e-mail connector also retrieves incoming e-mail messages received at the e-mail server computer and submits the e-mail messages to the CRM server. If the CRM server decides that the e-mail should be accepted, the e-mail messages are added to the CRM server. In embodiments, all e-mail messages may be accepted, only e-mails related to other e-mails may be accepted, only e-mail messages from a sender matching the e-mail address of a CRM contact may be accepted, or other more complex filtering rules may be utilized. Through the use of the e-mail connector in this manner, the CRM system can send and receive CRM-related e-mail messages using an external e-mail system. Additional details regarding this process and others will be described below with respect to FIGS. 1-5.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for providing a bi-directional e-mail transport between a CRM system and an e-mail system will be described. In particular, FIGS. 1A-1B are network and software architecture diagrams that provide details regarding an illustrative operating environment for the embodiments presented herein along with aspects of several software components disclosed herein.

Figure 1A:
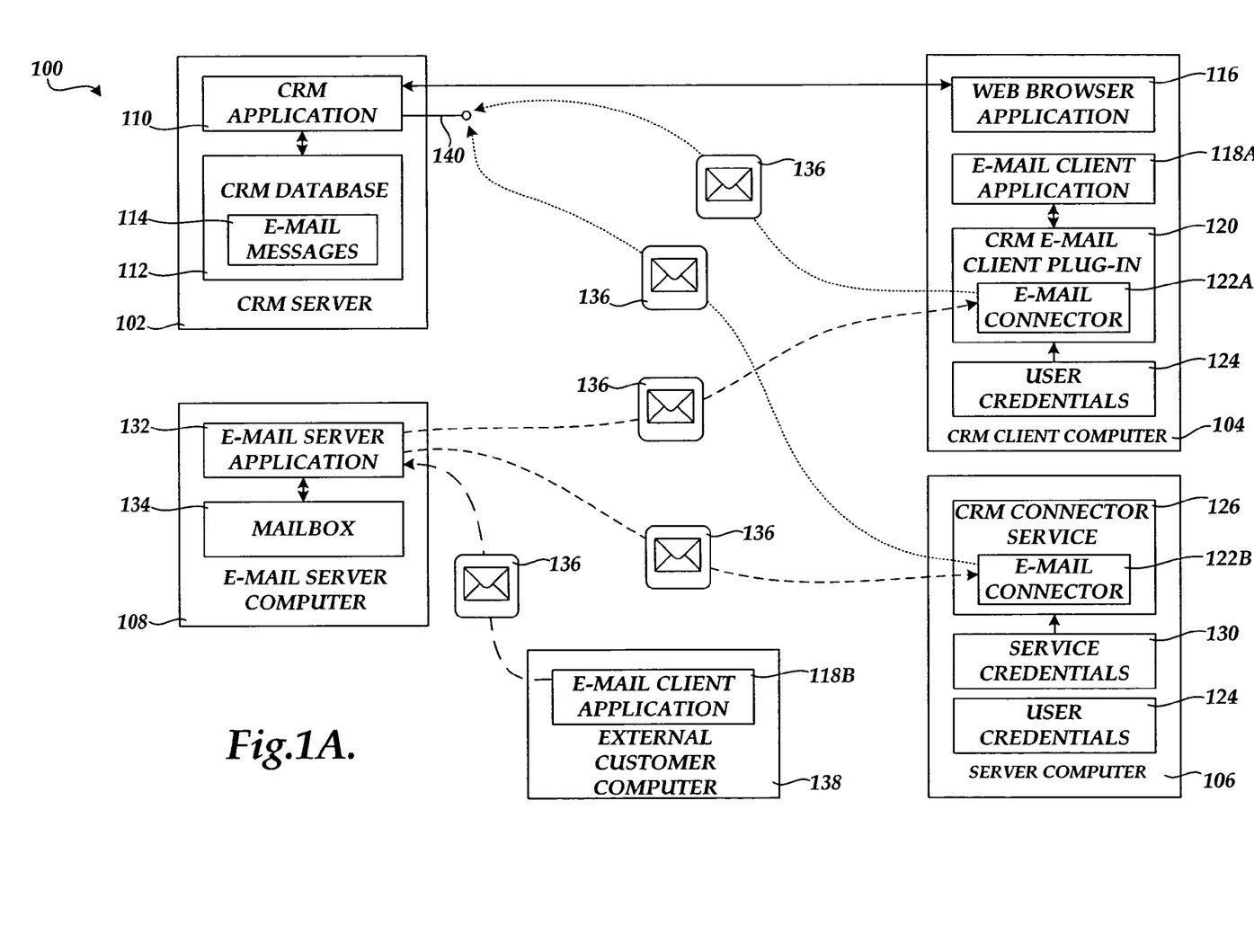
FIGS. 1A-1B are network and software architecture diagrams showing an illustrative network and several software components provided by one embodiment described herein.
Figure 1B:
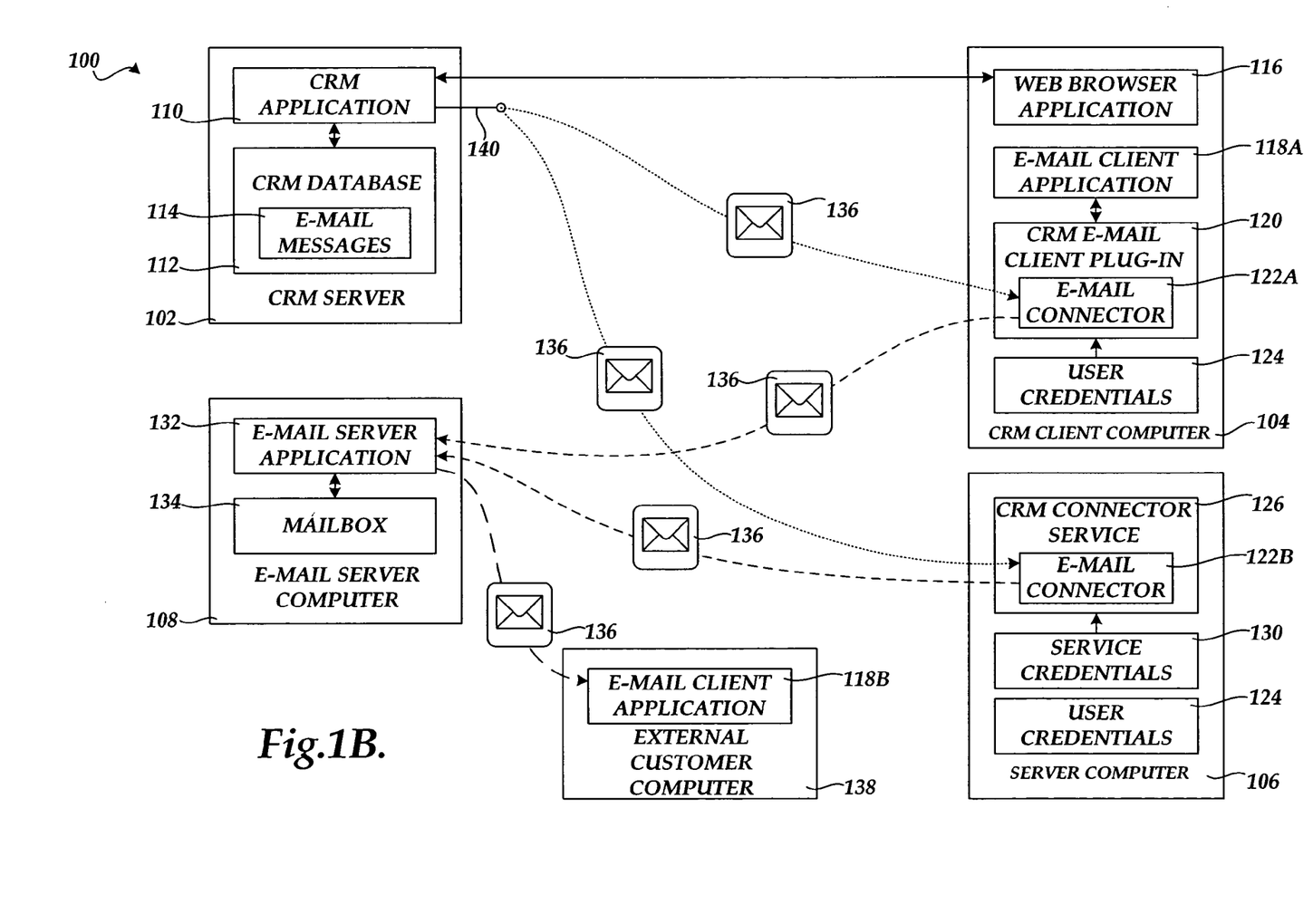

The illustrative computing system 100 shown in FIGS. 1A-1B includes a CRM server 102. The CRM server 102 executes a CRM application 110 and maintains an associated CRM database 112. The CRM server 102 provides functionality for managing relationships with business customers, including the capture, storage, and analysis of customer information. This data is stored by the CRM application 110 in the CRM database 112. Customer data stored in the CRM database 112 may be associated with a customer number, order number, or other type of CRM object. According to implementations, the CRM database 112 is a structured query language ("SQL") database. It should be appreciated, however, that any type of database technology may be utilized to embody the CRM database 112.

The CRM functionality provided by the CRM application 110 may be accessed through the use of a web browser application 116 executing on the CRM client computer 104. In this manner, the CRM client computer 104 can be utilized by a CRM subscriber to access functionality provided by the CRM application 110 for creating and viewing customer information, for communicating with customers via the CRM server 102, and for performing other CRM-related functions. The CRM server 102 utilizes e-mail as a primary method of communicating with customers. The CRM application 110 stores CRM-related e-mail messages 114 in the CRM database 112 or in another database accessible to the CRM application 110.

Customers receive e-mail messages sent from the CRM application 110 using an e-mail client application 118B executing on the external customer computer 138. Customers may also receive such e-mail messages through the use of a web browser application program and a hosted web mail service. In response to receiving an e-mail message from the CRM server 102, a customer may utilize the e-mail client application 118B or a hosted web mail service to transmit a response e-mail message to the CRM server 102. As will be described in detail below, such e-mail messages may be sent and received by the CRM server 102 through the use of an e-mail connector executing on the CRM client computer 104 or the server computer 106.

The computing system 100 shown in FIGS. 1A-1B also includes an e-mail server computer 108. The e-mail server computer 108 executes an e-mail server application 132 that hosts at least one mailbox 134. The mailbox 134 is utilized to store incoming and outgoing e-mail messages for a corresponding e-mail account maintained by the e-mail server application 132. It should be appreciated that the e-mail server 108 may comprise any type of e-mail server including but not limited to a post office protocol ("POP") e-mail server, an EXCHANGE SERVER from MICROSOFT CORPORATION of Redmond, Wash., an IBM LOTUS NOTES server from IBM SOFTWARE GROUP, or a web-based e-mail solution such as HOTMAIL/WINDOWS LIVE MAIL from MICROSOFT CORPORATION. As will be described in greater detail below, the e-mail connector provided herein can be configured for use with any type of e-mail server computer.

According to the various implementations presented herein, the CRM application 110 is a hosted application remotely accessible over a distributed computing network such as the Internet. It should be appreciated, however, that the CRM application 110 may be installed at a subscriber's site and accessed over a local area network by the CRM client computer 104. Similarly, the e-mail server application 132 may be executed on a remotely located e-mail server computer 108 or on an e-mail server computer 108 operated at the same location as the CRM server 102 and the CRM client computer 104. In this regard, it should be appreciated that the CRM server 102, the CRM client computer 104, the e-mail server computer 108, and the server computer 106 may be at the same or different physical locations and connected via appropriate local or wide area networks.

As will be described in greater detail below, a CRM e-mail client plug-in 120 is provided in one implementation. The CRM e-mail client plug-in 120 provides functionality for interacting with the CRM application 110 from within the e-mail client application 118A. In one embodiment, this functionality includes creating a bi-directional e-mail transport between the CRM application 110 and the e-mail server application 132. In order to provide this functionality, the CRM e-mail client plug-in 120 allows an e-mail connector 122A to be utilized that provides a conduit between the e-mail server application 132 and the CRM application 110.

As will be described in greater detail below, an e-mail message 136 may be transmitted from the e-mail client application 118B to the e-mail server application 132. The e-mail server application 132 stores the e-mail message 136 in the mailbox 134. Periodically, the e-mail connector 122A polls the e-mail server application 132 for new e-mail messages. The e-mail connector 122A may utilize stored user credentials 124 to authenticate itself to the e-mail server application 132. If new e-mail messages are present at the e-mail server computer 108, such as the e-mail message 136, the e-mail connector 122A will retrieve the messages from the e-mail server application 132. The e-mail connector 122A will then transmit the e-mail messages to the CRM application 110 for inclusion in the CRM database 112.

According to another implementation, a CRM connector service 126 is provided for creating a bi-directional transport for e-mail messages between the CRM application 110 and the e-mail server application 132. The CRM connector service 126 is a service that may be executed on a headless server computer, such as the server computer 106. The CRM connector service 126 also includes an e-mail connector 122B. Periodically, the e-mail connector 122B polls the e-mail server application 132 for new e-mail messages. The e-mail connector 122B may utilize service credentials 130 to authenticate itself with the e-mail server application 132. For instance, an e-mail account may be created at the e-mail server application 132 that is not associated with a particular user. The e-mail connector 122B may utilize the service credentials 130 to access such an account.

Alternatively, the e-mail connector 122B may utilize stored user credentials 124 to authenticate itself to the e-mail server application 132. In this way, the e-mail connector 122B may be utilized as a backup to the e-mail connector 122A. For instance, if the CRM e-mail client plug-in 120 is not executing, the CRM connector service 126 and the e-mail connector 122B may be utilize to provide the e-mail transport between the CRM application 110 and the e-mail server application 132. If new e-mail messages are present at the e-mail server computer 108, such as the e-mail message 136, the e-mail connector 122B will retrieve the messages from the e-mail server application 132. The e-mail connector 122B will then transmit the e-mail messages to the CRM application 110 for inclusion in the CRM database 112. According to embodiments, a World Wide Web ("Web") interface may be provided for supplying e-mail access credentials to the CRM connector service 126. Additional details regarding a process for transmitting e-mail messages to the CRM application 110 are provided below with respect to FIG. 3.

According to various implementations, a user may be permitted to specify the method they prefer for e-mail processing. For instance, an appropriate user interface may be provided to a user that allows the specification of whether no e-mail processing is to be performed, e-mail messages are to be processed by the CRM e-mail client plug-in 120, or that e-mail messages are to be processed by the CRM connector service 126. In this manner, a user can select the most appropriate mechanism for processing e-mail messages at any given time.

Turning now to FIG. 1B, additional details regarding the operation of the e-mail connectors 122A-122B will be provided. In particular, FIG. 1B illustrates an embodiment wherein the e-mail connectors 122A-122B provide a conduit to the e-mail server application 132 for e-mail messages outgoing from the CRM application 110. In this embodiment, the e-mail connectors 122A-122B communicate with the CRM application 110 to determine whether any e-mails are pending send. If so, the e-mail connectors 122A-122B retrieve the e-mails pending send from the CRM application 110. In the example shown in FIG. 1B, the e-mail message 136 is being retrieved from the CRM application 110 by the e-mail connectors 122A-122B. According to implementations, the e-mail connectors 122A-122B may download e-mail messages in bulk from the CRM application 110. Moreover, the CRM application 110 implements synchronization mechanisms for ensuring that each e-mail messages is only sent once by one of the e-mail connectors 122A-122B.

Once an e-mail connector has retrieved an e-mail message to be sent, the e-mail connector authenticates itself with the e-mail server application 132 and sends the e-mail message. The e-mail message may then be retrieved by its intended recipient using an appropriate e-mail client application, such as the e-mail client application 118B. In this manner, the e-mail connectors 122A-122B provide a conduit for e-mail messages sent by the CRM server 102. Additional details regarding this process are provided below with respect to FIG. 4.

In both of the embodiments described above, the CRM application 110 is operative to expose an API 140 for use by the e-mail connectors 122A-122B. The API 140 provides methods through which the e-mail connectors 122A-122B can retrieve e-mail messages pending send from the CRM application 110 in bulk, add e-mail messages received from the e-mail server application 132 to the CRM database 112, determine whether an e-mail message is CRM related, and perform other functions. Additional details regarding the API 140 are provided below with respect to FIGS. 3-4.

According to implementations, the CRM connector service 126 is operative to configure itself utilizing information obtained from the CRM application 110. In particular, according to one implementation, the CRM connector service 126 obtains information regarding a user from the CRM application 110, including an e-mail address. The CRM connector service 126 applies a configuration template to this information to generate a runtime configuration file. The runtime configuration file is utilized to schedule the e-mail processing activities of the CRM connector service 126. Through this mechanism, the CRM connector service 126 can detect configuration changes, update its configuration, and reschedule its e-mail processing activities.

Figure 2:
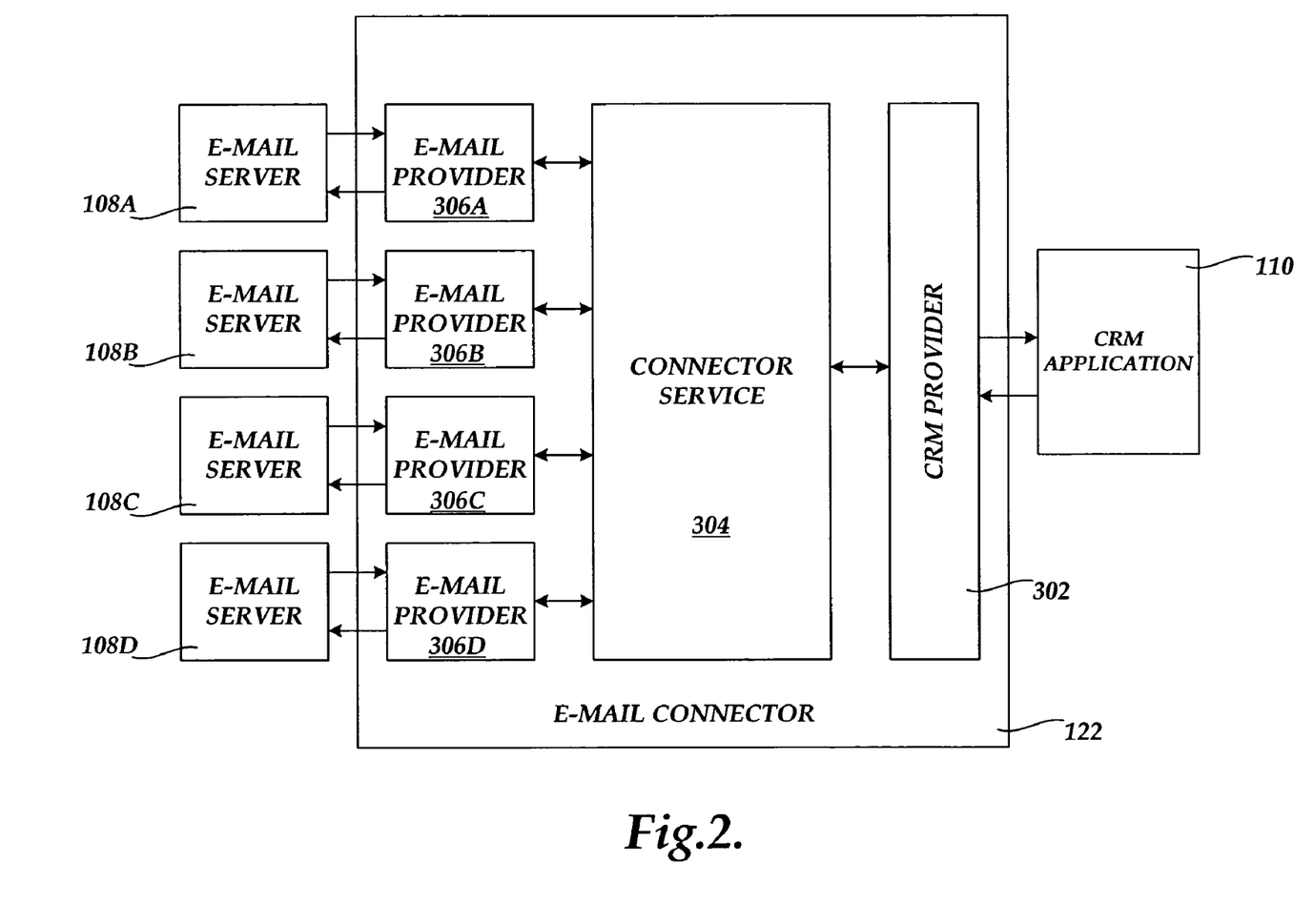
FIG. 2 is a software architecture diagram showing aspects of an e-mail connector provided in one implementation described herein.

Referring now to FIG. 2, additional details will be provided regarding the e-mail connector 122. In particular, FIG. 2 is a software architecture diagram showing the architecture of an e-mail connector 122 utilized in one embodiment described herein. As shown in FIG. 2, the e-mail connector 122 utilizes one or more pluggable e-mail providers 206A-206B. Each of the e-mail providers 206A-206D provides functionality for interfacing with a corresponding e-mail server 108A-108D, respectively. For instance, the e-mail provider 206A may provide functionality for interfacing with a POP3 e-mail server computer while the e-mail provider 206B provides functionality for interfacing with a MICROSOFT EXCHANGE SERVER e-mail server computer. In this manner, multiple, disparate e-mail servers may be supported by a single e-mail connector 122.

The illustrative e-mail connector 122 shown in FIG. 2 also includes a connector service 204. The connector service 204 is responsible for interfacing with each of the e-mail providers 206A-206D and the CRM provider 202, and for performing the functionality described below with respect to FIGS. 3-4. The CRM provider 202 provides an interface to the CRM application 110. It should be appreciated that multiple CRM providers 202 may be utilized to provide an interface to multiple, disparate CRM applications. In this manner, a single e-mail connector 122 may be utilized to provide a connection between multiple, disparate e-mail servers and multiple, disparate CRM applications.

According to other implementations, the connector service 204 provides an architecture that supports the use of pluggable providers created by third parties. A provider may be created from scratch or by specializing an existing provider. The creation and use of pluggable providers in this manner permits the architecture shown in FIG. 2 to be highly extensible, as the connector 204 can provide support for virtually any e-mail protocol through the use of a pluggable provider. Moreover, it should be appreciated that the connector architecture shown in FIG. 2 also allows remote connection between CRM and e-mail systems over the Internet by using the appropriate protocols and authentication methods. Previous solutions were limited to the same domain and sometimes the same computer.

Figure 3:
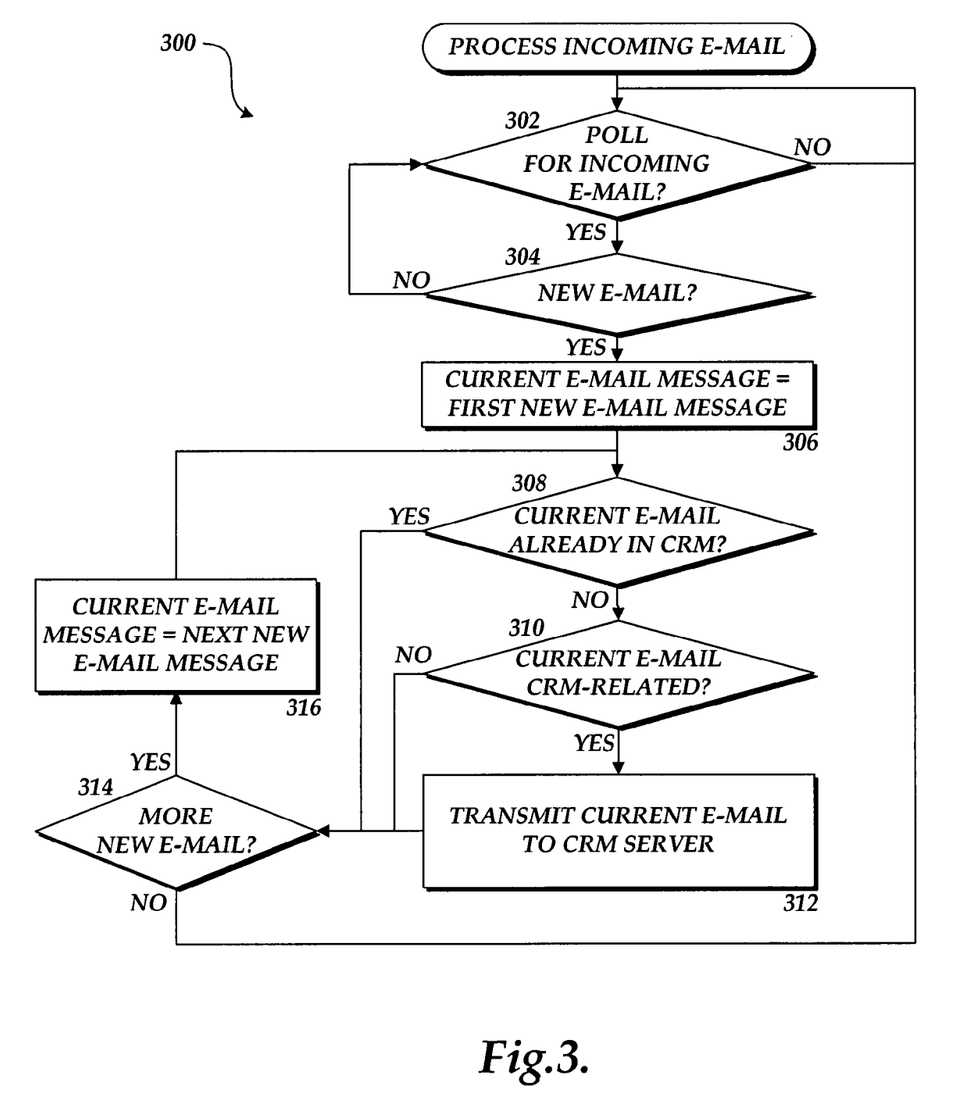
FIGS. 3-4 are flow diagrams showing illustrative processes for providing a bi-directional e-mail transport between a CRM server computer and an e-mail server computer in one embodiment presented herein.

Referring now to FIG. 3, additional details will be provided regarding the embodiments presented herein for providing an e-mail connection between an e-mail server computer and a CRM server computer. In particular, FIG. 3 is a flow diagram showing a routine 300 that illustrates aspects of the operation of the e-mail connector 122 for processing incoming e-mail messages to the CRM server 102 in one implementation described herein.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein with respect to the various figure.

The routine 300 begins at operation 302, where the e-mail connector 122 determines whether the e-mail server application 132 should be polled for new e-mail messages. According to embodiments, the time between polling operations may be configured in the e-mail connector 122. It should also be appreciated that although a polling mechanism is described herein, an appropriate "push" mechanism may be utilized to transfer e-mail messages from the e-mail server application 132 to the e-mail connector 122.

If, at operation 302, the e-mail connector 122 determines that a polling operation is not required, the routine 300 returns to operation 302. If, however, a polling operation is required, the e-mail connector 122 polls the e-mail server application 132 for new e-mail messages. As described above, the e-mail connector 122 may authenticate itself with the e-mail server application 132 utilizing stored user credentials 124, stored service credentials 130, or a current security context prior to communicating with the e-mail server application 132. If new e-mail messages are present at the e-mail server application 132, the routine 300 continues from operation 304 to operation 306. If no new messages are identified, the routine 300 returns from operation 304 to operation 302, where another polling operation may be performed after a predetermined period of time has elapsed.

At operation 306, the e-mail connector 122 utilizes a temporary variable to store the identity of a current e-mail message in a collection of new e-mail messages to be processed. In particular, the value of a current e-mail message variable is set to the first new e-mail message retrieved from the e-mail server application 132. The routine 300 then continues to operation 308, where the e-mail connector 122 determines whether the current e-mail message has previously been transmitted to the CRM application 110. The e-mail connector 122 may maintain data structures or other data indicating which e-mail messages have already been processed and forwarded to the CRM application 110.

If the current e-mail message has previously been transmitted to the CRM application 110, the routine 300 proceeds from operation 308 to operation 314. If the current e-mail message has not been previously transmitted to the CRM application 110, the routine 300 proceeds to operation 310 where the e-mail connector 122 determines whether the current e-mail message is CRM related. According to one implementation, the API 140 includes methods for use by the e-mail connector 122 in making this determination. In particular, a method may be exposed through the API 140 that allows the e-mail connector 122 to submit portions of the current e-mail message. Using the submitted data, the CRM application 110 can determine whether the current e-mail message is CRM related. A response is then provided to the e-mail connector 122 indicating whether the current e-mail message is CRM related. Other processes may also be performed by the e-mail connector 122 to determine whether the current e-mail message is CRM related.

If the current e-mail message is not CRM related, the routine 300 proceeds from operation 310 to operation 314. If the current e-mail message is CRM related, the routine 300 proceeds to operation 312, where the e-mail connector 122 transmits the current e-mail message to the CRM application 110 for inclusion in the CRM database 112. When the CRM application 110 receives the e-mail message, it may create a CRM activity based on the e-mail message, link the e-mail message to an existing CRM activity, or perform other processing.

From operation 312, the routine 300 proceeds to operation 313, where the e-mail connector 122 determines whether there are any additional new e-mail messages to be processed. If so, the routine 300 proceeds from operation 314 to operation 316, where the variable storing the current e-mail message is set to the next new e-mail message. The routine 300 then returns to operation 308, where the current e-mail message is processed in the manner described above. If no new e-mail messages remain to be processed, the routine 300 proceeds from operation 314 to operation 302, where the above-described process is repeated.

According to implementations, various procedures may be utilized to retry the process illustrated in FIG. 3 following the failure to receive an e-mail message. For instance, in embodiments, the particular strategy utilized may depend upon the type of protocol utilized or the type of mailbox for which messages are being received. For example, if the mailbox is a sink mailbox not associated with a user account, messages not accepted by the CRM application 110 may be retried until a predetermined period of time has passed. For a user mailbox, multiple retries may be made in a round robin fashion. The user may also provide preferences regarding how retries are performed. Other processes and algorithms may also be utilized.

Figure 4:
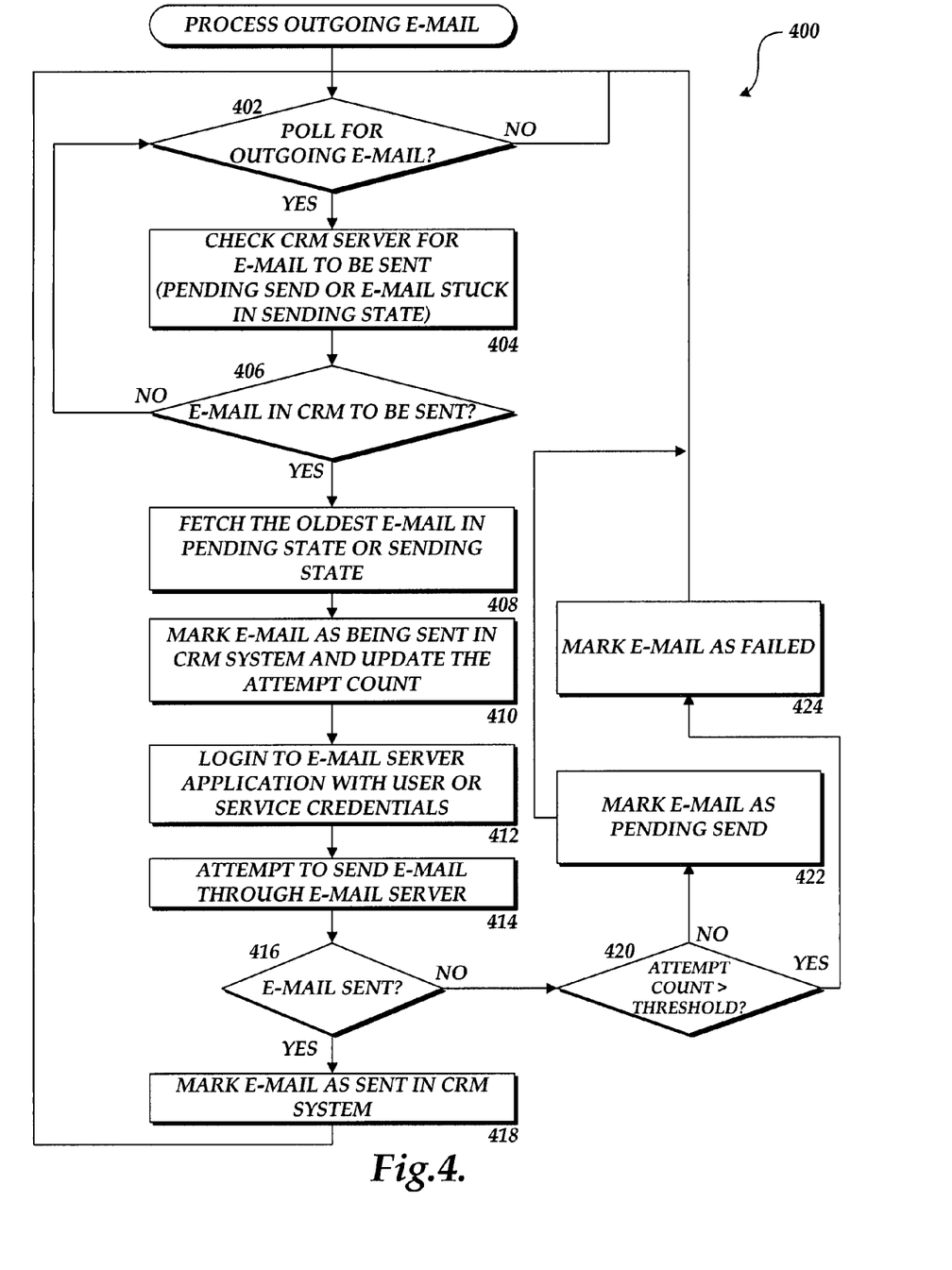

Turning now to FIG. 4, a routine 400 will be described that illustrates aspects of the operation of the e-mail connector 122 for processing outgoing e-mail messages from the CRM server 102 to the e-mail server application 132 in one implementation described herein. The routine 400 begins at operation 402, where the e-mail connector 122 determines whether the CRM application 110 should be polled for new e-mail messages. As discussed above, the time between polling operations may be configured in the e-mail connector 122. An appropriate "push" mechanism may alternately be utilized to transfer e-mail messages from the CRM application 132 to the e-mail connector 122.

If, at operation 402, the e-mail connector 122 determines that a polling operation is not required, the routine 400 returns to operation 402. If, however, a polling operation is required, the routine 400 continues to operation 404, where the e-mail connector 122 polls the CRM application 110 for new e-mail messages that are pending send. The e-mail connector 122 also polls the CRM application 110 for e-mails that appear to be stuck in the sending state. If no new messages are identified, the routine 400 returns from operation 406 to operation 402, where another polling operation may be performed after a predetermined period of time has elapsed. If new e-mail messages pending send or e-mail messages that are stuck in the sending state are available from at the CRM application 110, the routine 400 continues from operation 406 to operation 408.

At operation 408, the e-mail connector 122 retrieves the oldest e-mail that is pending send or that is in the sending state from the CRM application 110. The routine 400 then continues to operation 410, where the e-mail connector 122 marks the retrieved message as being sent. The e-mail connector 122 also increments a variable maintained at the CRM application 110, called the attempt count, that indicates the number of attempts that have been made to send the message. From operation 410, the routine 400 continues to operation 412, where the e-mail connector 122 authenticates itself with the e-mail server application 132 with the user credentials 124 or the service credentials 130 in the manner described above. Once the e-mail connector 122 has been authenticated, the routine 400 continues to operation 414, where the e-mail connector 122 attempts to send the e-mail message through the e-mail server application 132. The routine 400 then continues to operation 416.

At operation 416, the e-mail connector 122 determines if the e-mail message was sent. If the e-mail message was sent, the routine 400 proceeds from operation 416 to operation 418, where the sent e-mail message is marked as having been sent at the CRM application 110. The routine 400 then proceeds from operation 418 to operation 402, described above, where the process repeats. If, at operation 416, the e-mail connector 122 determines that the e-mail message was not sent, the routine 400 proceeds from operation 416 to operation 420.

At operation 420, the e-mail connector 122 determines whether the attempt count variable described for the e-mail message exceeds a predefined threshold. The threshold specifies the number of retry attempts that should be made for each e-mail message before failure. If the attempt count does not exceed the threshold, the routine 400 continues from operation 420 to operation 422, where the e-mail message is marked as pending send at the CRM application 110. If the attempt count exceeds the threshold, the routine 400 continues from operation 420 to operation 424, where the e-mail is marked as having failed send at the CRM application 110. From operations 422 and 424, the routine 400 returns to operation 402, described above, where the process shown in FIG. 4 repeats.

Figure 5:
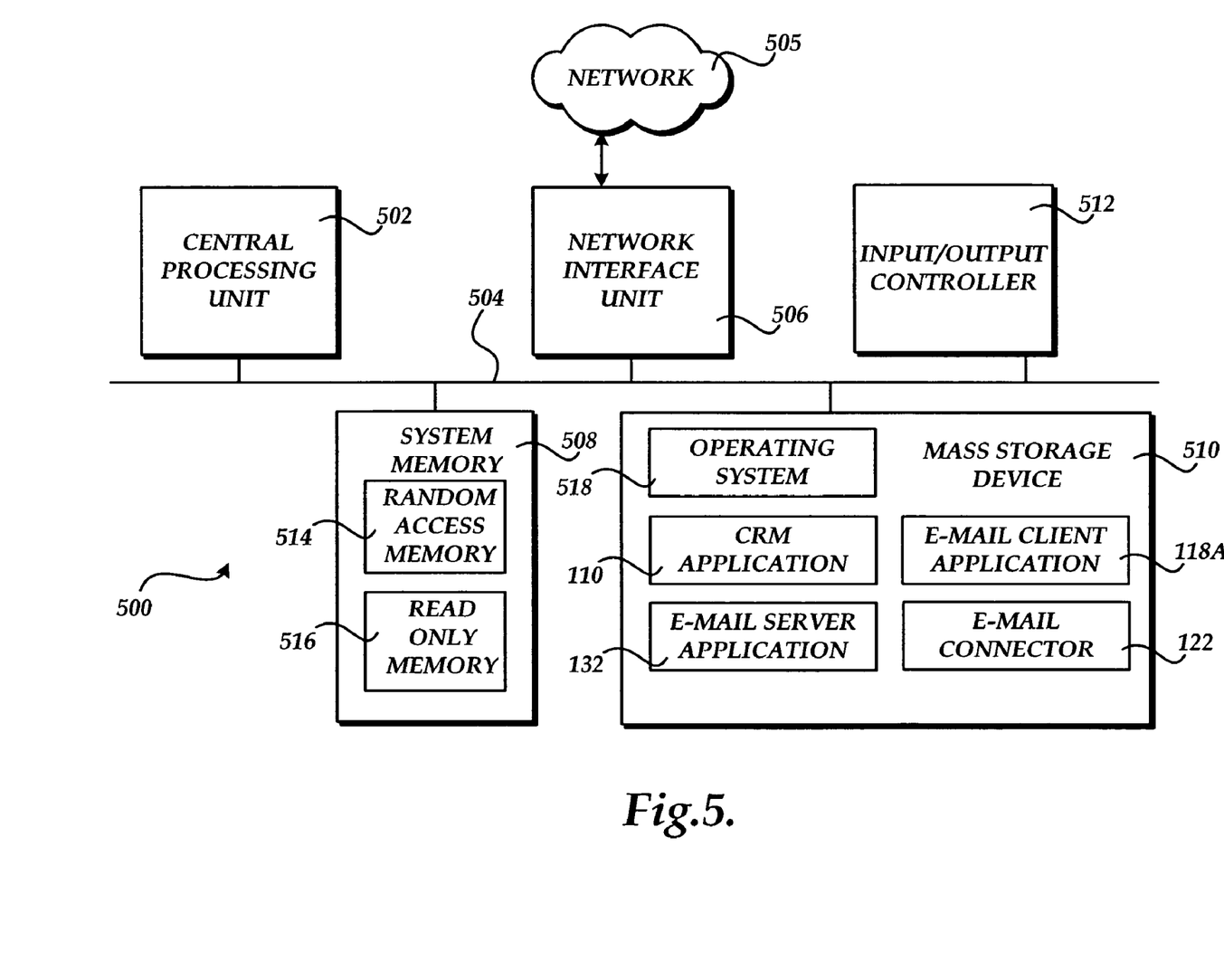
FIG. 5 is a computer architecture diagram showing an illustrative hardware architecture suitable for implementing the computing systems described with reference to FIGS. 1-4.

Referring now to FIG. 5, an illustrative computer architecture for a computer 500 capable of executing the software components described above with respect to FIGS. 1-4 will be discussed. The computer architecture shown in FIG. 5 illustrates a conventional desktop, laptop, or server computer and may be utilized to embody any of the computer systems described herein.

The computer architecture shown in FIG. 5 includes a central processing unit 502 ("CPU"), a system memory 508, including a random access memory 514 ("RAM") and a read-only memory ("ROM") 516, and a system bus 504 that couples the memory to the CPU 502. A basic input/output system containing the basic routines that help to transfer information between elements within the computer 500, such as during startup, is stored in the ROM 516. The computer 500 further includes a mass storage device 510 for storing an operating system 518, application programs, and other program modules, which will be described in greater detail below.

The mass storage device 510 is connected to the CPU 502 through a mass storage controller (not shown) connected to the bus 504. The mass storage device 510 and its associated computer-readable media provide non-volatile storage for the computer 500. Although the description of computer-readable media contained herein refers to a mass storage device, such as a hard disk or CD-ROM drive, it should be appreciated that computer-readable media can be any available media that can be accessed by the computer 500.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 500.

According to various embodiments, the computer 500 operates in a networked environment using logical connections to remote computers through a network such as the network 505. The computer 500 may connect to the network 505 through a network interface unit 506 connected to the bus 504. It should be appreciated that the network interface unit 506 may also be utilized to connect to other types of networks and remote computer systems. The computer 500 may also include an input/output controller 512 for receiving and processing input from a number of other devices, including a keyboard, mouse, or electronic stylus (not shown in FIG. 5). Similarly, an input/output controller may provide output to a display screen, a printer, or other type of output device (also not shown in FIG. 5).

As mentioned briefly above, a number of program modules and data files may be stored in the mass storage device 510 and RAM 514 of the computer 500, including an operating system suitable for controlling the operation of a networked desktop, laptop, or server computer. The mass storage device 510 and RAM 514 may also store one or more program modules. In particular, the mass storage device 510 and the RAM 514 may store the CRM application 110, the e-mail server application 132, the e-mail client application 118A, and the e-mail connector 122, each of which has been described above with reference to FIGS. 1-4. Other program modules may also be stored in the mass storage device 510 and utilized by the computer 500.

Based on the foregoing, it should be appreciated that technologies for providing a bi-directional e-mail transport between a CRM server computer and an e-mail server computer are disclosed herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for connecting an electronic mail (e-mail) server computer and a customer relationship management (CRM) server computer, the method comprising performing computer-implemented operations for:
    determining whether one or more e-mail messages pending send are present at the CRM server computer;
    in response to determining that one or more e-mail messages pending send are present at the CRM server computer, retrieving, via a first e-mail connector operating on a first computer, a first set of the e-mail messages pending send from the CRM server computer and retrieving, via a second e-mail connector operating on a second computer, a second set of the e-mail messages pending send from the CRM server computer, wherein the first e-mail connector comprises a first plurality of pluggable e-mail providers, each of the first plurality of pluggable e-mail providers providing functionality for interfacing with a corresponding e-mail server computer, the first plurality of pluggable e-mail providers comprising a first pluggable e-mail provider providing functionality for interfacing with the e-mail server computer, wherein the second e-mail connector comprises a second plurality of pluggable e-mail providers, each of the second plurality of pluggable e-mail providers providing functionality for interfacing with the corresponding e-mail server computer, the second plurality of pluggable e-mail providers comprising a second pluggable e-mail provider providing functionality for interfacing with the e-mail server computer;
    establishing first communication between the e-mail server computer and the CRM server computer via the first e-mail connector using first credentials stored on the first computer;
    in response to establishing the first communication, sending the first set of the e-mail messages from the first computer to the e-mail server computer via the first pluggable e-mail provider;
    establishing second communication between the e-mail server computer and the CRM server computer via the second e-mail connector using second credentials stored on the second computer;
    in response to establishing the second communication, sending the second set of the e-mail messages from the second computer to the e-mail server computer via the second pluggable e-mail provider, the e-mail server computer configured to make available the first set of the e-mail messages and the second set of the e-mail messages to an external e-mail client application;
    determining whether a new e-mail message is present at the e-mail server computer;
    in response to determining that the new e-mail message is present at the e-mail server computer, determining whether the new e-mail message is CRM related by transmitting a portion of the new e-mail message from the e-mail server computer to the CRM server computer and receiving, at the e-mail server computer, a response indicating whether the new e-mail message is CRM related based on the portion of the new e-mail message;
    in response to determining that the new e-mail message is CRM related based on the response received from the CRM server computer, submitting the new e-mail message to the CRM server computer for inclusion in a CRM database maintained by the CRM server computer; and
    in response to determining that the new e-mail message is not CRM related based on the response received from the CRM server computer, not submitting the new e-mail message to the CRM server computer for inclusion in the CRM database maintained by the CRM server computer.

2. The computer-Implemented method of claim 1, wherein determining whether one or more e-mail messages pending send are present at the CRM server computer comprises communicating with the CRM server computer via an application programming interface (API) exposed by the CRM server computer to determine whether one or more e-mail messages pending send are present at the CRM server computer.

3. The computer-implemented method of claim 1, wherein the first e-mail connector is implemented as an e-mail client application plug-in.

4. The computer-implemented method of claim 3, further comprising authenticating the e-mail client application plug-in at the e-mail server computer using a stored user credential prior to communicating with the e-mail server computer.

5. The computer-implemented method of claim 1, wherein the first e-mail connector is implemented as a service executing on a server computer.

6. The computer-implemented method of claim 5, further comprising authenticating the service at the e-mail server computer using a stored service credential prior to communicating with the e-mail server computer.

7. The computer-implemented method of claim 5, further comprising authenticating the service at the e-mail server computer using a stored user credential prior to communicating with the e-mail server computer.

8. The computer-implemented method of claim 1, wherein the CRM server computer implements a synchronization measure preventing duplicate e-mail messages between the first set of the e-mail messages and the second set of the e-mail messages.

9. The method of claim 1, further comprising providing a user interface that allows specification of whether the e-mail messages are to be processed by the first e-mail connector.

10. The method of claim 1, wherein the first e-mail connector is obtaining information regarding a user from the CRM server computer and to apply a configuration template to the information to generate a runtime configuration file.

11. A computer-implemented method for connecting an electronic mail (e-mail) server computer and a customer relationship management (CRM) server computer, the method comprising performing computer-implemented operations for:

exposing an application programming interface (API) at the CRM server computer, the API operative to receive requests from a first e-mail connector operating on a first computer and a second e-mail connector operating on a second computer for e-mail messages pending send at the CRM server computer and to receive requests from the first e-mail connector and the second e-mail connector to add e-mail messages received from the e-mail server computer to the CRM server computer, wherein the first e-mail connector comprises a first plurality of pluggable e-mail providers, each of the first plurality of pluggable e-mail providers providing functionality for interfacing with a corresponding e-mail server computer, the first plurality of pluggable e-mail providers comprising a first pluggable e-mail provider providing functionality for interfacing with the e-mail server computer, wherein the second e-mail connector comprises a second plurality of pluggable e-mail providers, each of the second plurality of pluggable e-mail providers providing functionality for interfacing with the corresponding e-mail server computer, the second plurality of pluggable e-mail providers comprising a second pluggable e-mail provider providing functionality for interfacing with the e-mail server computer;

receiving a first request at the API from the first e-mail connector for e-mail messages pending send and providing a first set of the e-mail messages pending send to the first e-mail connector in response to the first request;

receiving a second request at the API from the second e-mail connector for e-mail messages pending send and providing a second set of the e-mail messages pending send to the second e-mail connector in response to the second request;

receiving a request at the API from the first e-mail connector to add a new e-mail message received from the e-mail server computer to the CRM server computer;

in response to the request, receiving, at the API from the e-mail server computer, a portion of the new e-mail message via the first e-mail connector;

determining, at the CRM server computer, whether the portion of the new e-mail message is CRM related;

in response to determining that the portion of the new e-mail message is CRM related, transmitting, from the CRM server computer to the first e-mail connector, a first message indicating that the new e-mail message is CRM related;

upon transmitting the first message, receiving, at the CRM server computer from the first e-mail connector, the new e-mail message and adding the new e-mail message to the CRM server computer; and in response to determining that the portion of the new e-mail message is not CRM related, transmitting, from the CRM server computer to the first e-mail connector, a second message indicating that the new e-mail message is not CRM related.

12. The computer-implemented method of claim 11, wherein the e-mail connector comprises an e-mail client application plug-in.

13. The computer-implemented method of claim 11, wherein the e-mail connector comprises a service executing on a server computer.

14. A system for providing a connection between a customer relationship management (CRM) server computer and an electronic mail (e-mail) server computer, the system comprising: the CRM server computer having a first processor executing a CRM application operative to expose an application programming interface (API) for receiving requests from a first e-mail connector operating on a first computer system and a second e-mail connector operating on a second computer system for e-mail messages pending send at the CRM server computer and to receive requests from the first e-mail connector to add new e-mail messages received from the e-mail server computer to the CRM server computer, wherein the first e-mail connector comprises a first plurality of pluggable e-mail providers, each of the first plurality of pluggable e-mail providers providing functionality for interfacing with a corresponding e-mail server computer, the first plurality of pluggable e-mail providers comprising a first pluggable e-mail provider providing functionality for interfacing with the e-mail server computer, wherein the second e-mail connector comprises a second plurality of pluggable e-mail providers, each of the second plurality of pluggable e-mail providers providing functionality for interfacing with the corresponding e-mail server computer, the second plurality of pluggable e-mail providers comprising a second pluggable e-mail provider providing functionality for interfacing with the e-mail server computer; the first computer system having a second processor executing the first e-mail connector operative to determine whether one or more e-mail messages pending send are present at the CRM server computer, to retrieve a first set of the e-mail messages pending send from the CRM server computer, to communicate with the e-mail server computer to cause each of the first set of the e-mail messages pending send to be sent through the e-mail server computer, to determine whether a new e-mail message is present at the e-mail server computer, in response to determining that the new e-mail message is present at the e-mail server computer, to determine whether the new e-mail message is CRM related by transmitting a portion of the new e-mail message to the CRM server computer and receiving a response indicating whether the new e-mail message is CRM related based on the portion of the new e-mail message, and in response to determining that the new e-mail message is CRM related based on the response received from the CRM server computer, to submit the new e-mail message to the CRM server computer for inclusion in a CRM database maintained by the CRM server computer; and the second computer system having a third processor executing the second e-mail connector operative to determine whether one or more e-mail messages pending send are present at the CRM server computer, to retrieve a second set of the e-mail messages pending send from the CRM server computer, to communicate with the e-mail server computer to cause each of the second set of the e-mail messages pending send to be sent through the e-mail server computer.

15. The system of claim 14, wherein determining whether one or more e-mail messages pending send are present at the CRM server computer comprises communicating with the CRM server computer via the API to determine whether one or more e-mail messages pending send are present at the CRM server computer.

16. The system of claim 14, wherein the e-mail connector comprises an e-mail client application plug-in.

17. The system of claim 16, wherein the e-mail client application plug-in is further operative to authenticate with the e-mail server computer using a stored user credential prior to communicating with the e-mail server computer.

18. The system of claim 14, wherein the e-mail connector comprises a service executing on a server computer.

19. The system of claim 18, wherein the service is further operative to authenticate with the e-mail server computer using a stored user credential prior to communicating with the e-mail server computer.

* * * * *